Feb. 24, 1953 W. M. ROBEY, JR 2,629,337
ELECTRIC CAR SQUEEZE
Filed Oct. 3, 1947 6 Sheets-Sheet 3
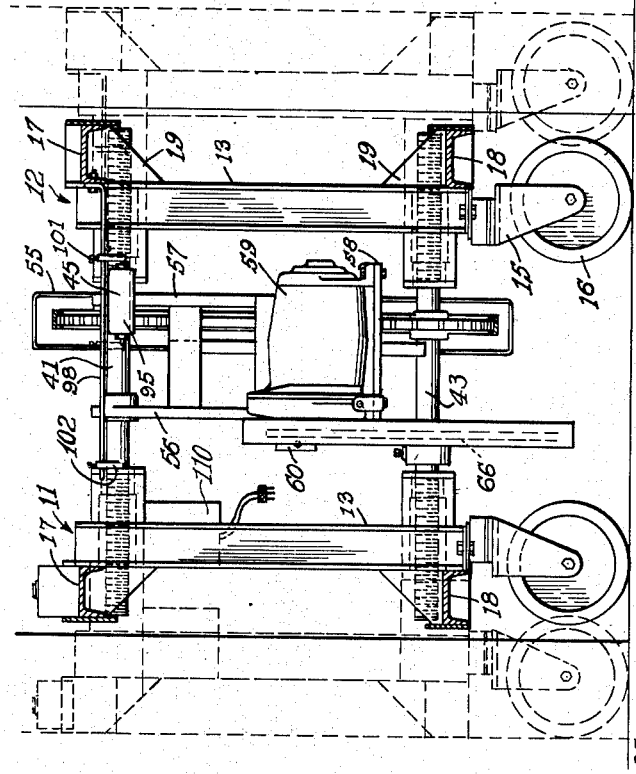
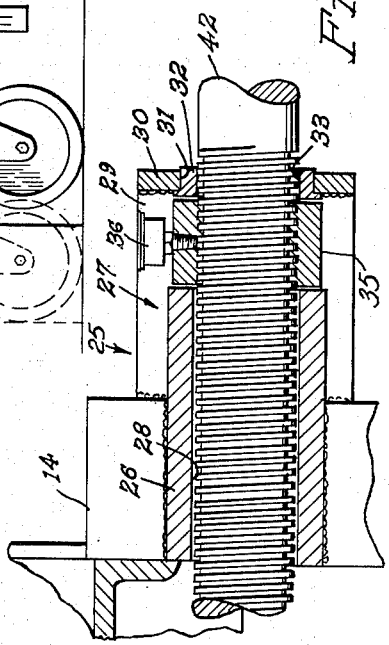
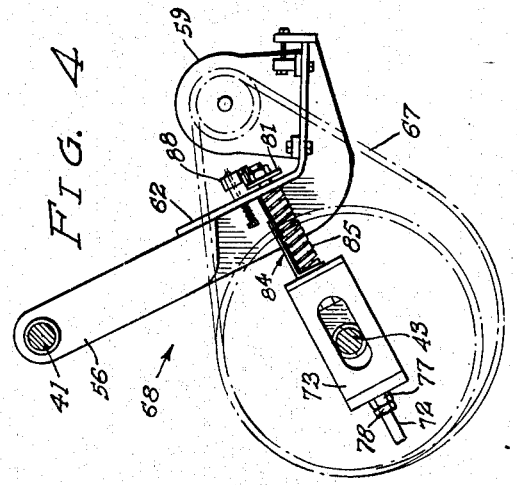
WESLEY M. ROBEY, JR.
INVENTOR.
BY
ATTORNEY Feb. 24, 1953 W. M. ROBEY, JR 2,629,337
ELECTRIC CAR SQUEEZE
Filed Oct. 3, 1947 6 Sheets-Sheet 4
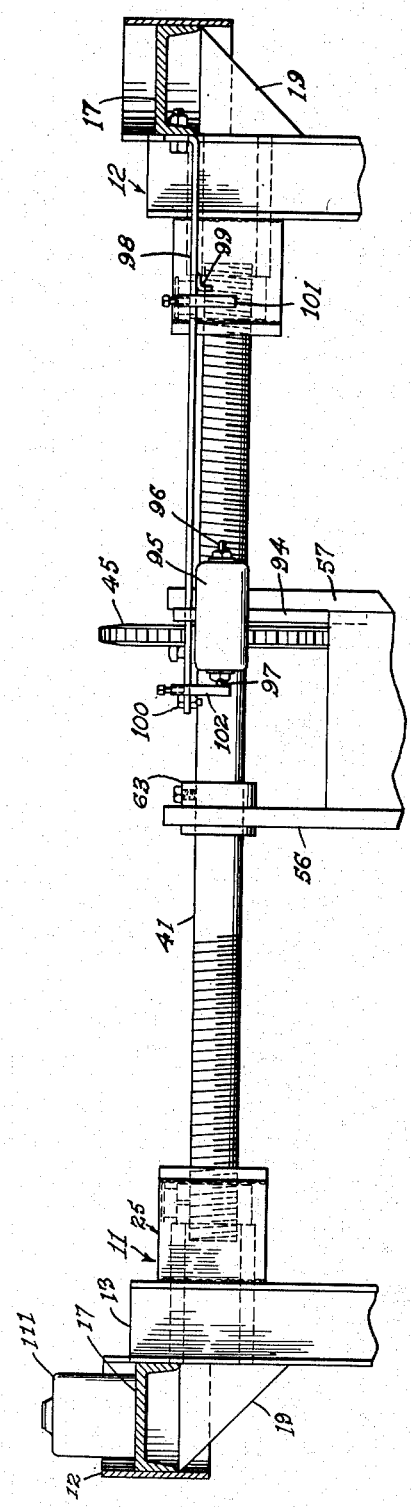
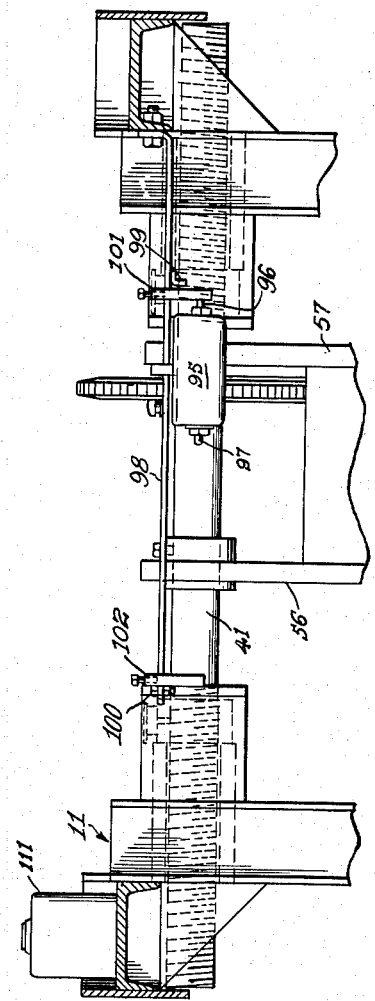
WESLEY M. ROBEY, JR.
INVENTOR.
BY
ATTORNEY Feb. 24, 1953    W. M. ROBEY, JR    2,629,337
ELECTRIC CAR SQUEEZE
Filed Oct. 3, 1947    6 Sheets-Sheet 5
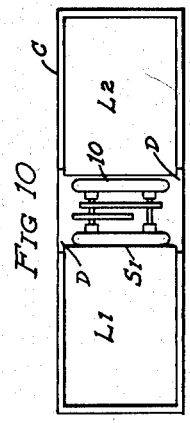
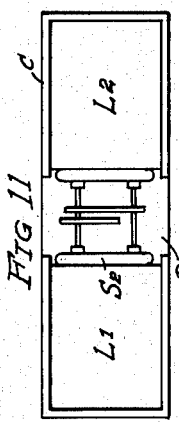
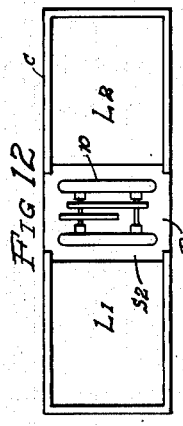
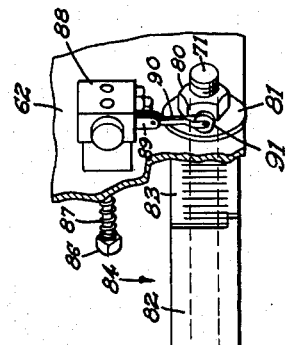
WESLEY M. ROBEY, JR.
INVENTOR.
BY
ATTORNEY

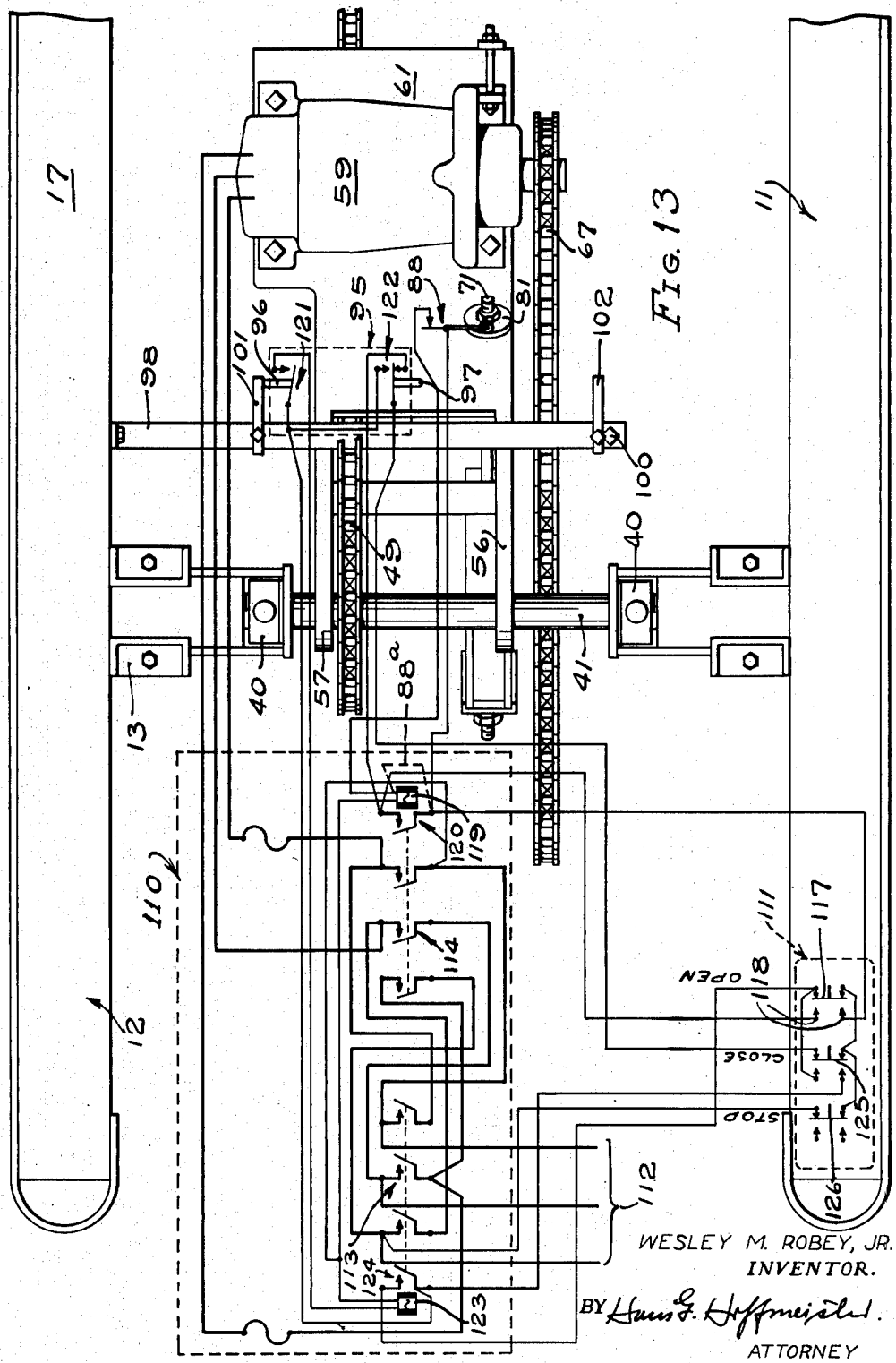

Patented Feb. 24, 1953

2,629,337

UNITED STATES PATENT OFFICE 2,629,337

ELECTRIC CAR SQUEEZE

Wesley M. Robey, Jr., Arlington, Calif., assignor to Food Machinery and Chemical Corporation, San Jose, Calif., a corporation of Delaware Application October 3, 1947, Serial No. 777,814

20 Claims. (Cl. 105—369)

This invention relates to presses and is particularly useful in compressing loads of boxes stacked in opposite ends of a railroad freight car.

Certain commodities such as crated citrus fruits are loaded in freight cars in packed and lidded crates. It is common practice to load opposite ends of a car with these crates and then insert an expanding press in the open space remaining in the doorway and, by expanding this press, compress the partial loads in the opposite ends of the car.

Hitherto, these expanding presses (which are known in the art as "car squeezes") have been manually operated and considerable labor has been involved in their use.

It is an object of this invention to provide an electrically operated car squeeze which will accomplish the compression of partial loads occupying opposite ends of a freight car.

After the partial loads occupying end sections of the freight car have thus been compressed, the car squeeze is retracted and removed from the car, following which, the enlarged space in the center of the car is filled with crates. In the practice followed heretofore, this retraction of the car squeeze to its normal condition was manually performed and took up quite a bit of the operator's time.

It is another object of the invention to provide an electric car squeeze which, when set in operation, is power operated to expand and compress partial loads between which the car squeeze has been inserted, and which will automatically carry said compression to a predetermined distance, and then return the car squeeze to its normal retracted condition.

It sometimes happens that the load in the car is not susceptible to being compressed as much as would be expected judging from the normal reaction of such partial loads to compression.

It is a still further object of the invention to provide an electric car squeeze which, in the event that an excessive pressure develops in the compression of partial loads in the opposite ends of a car, the expansion of the squeeze will be automatically halted.

The manner of accomplishing the foregoing objects as well as further objects and advantages will be made manifest in the following description taken in connection with the accompanying drawings in which:

Fig. 3 is a transverse sectional view taken on the line 3—3 of Fig. 1.

Fig. 4 is a fragmentary longitudinal sectional view taken on the line 4—4 of Fig. 1 and showing the overload mechanism actuated to cut out the drive motor of the device.

Fig. 5 is an enlarged sectional view taken on the line 5—5 of Fig. 1 and illustrating one of the jack screws of the squeeze with the nut associated therewith.

Fig. 6 is an enlarged transverse sectional view taken on the line 6—6 of Fig. 1 showing the car squeeze of the invention in expanded condition just as a control switch thereof is actuated to reverse the drive motor and start this operating to return the squeeze to retracted condition.

Fig. 7 is a view similar to Fig. 6 and illustrating the same parts of the invention just as the return to retracted condition has been completed and the drive motor is being stopped.

Fig. 8 is an enlarged fragmentary detail view similar to Fig. 4 and illustrating the motor cut out with the mechanism in its normal operating condition.

Fig. 9 is a horizontal sectional view taken on the line 9—9 of Fig. 8.

Fig. 10 is a diagrammatic plan view of a partially loaded car with the squeeze of this invention inserted in a central space between partial loads occupying opposite ends of the car.

Fig. 11 is a view similar to Fig. 10 and illustrating the car squeeze expanded to compress said partial loads and enlarge said central space.

Fig. 12 is a view similar to Fig. 11 showing the invention after it has returned to its retracted condition in readiness to be withdrawn from said enlarged space to permit said space to be filled with packed cases in completing the loading of the car.

Fig. 13 is a schematic wiring diagram showing the electrical system of the car squeeze.

Figure 1:
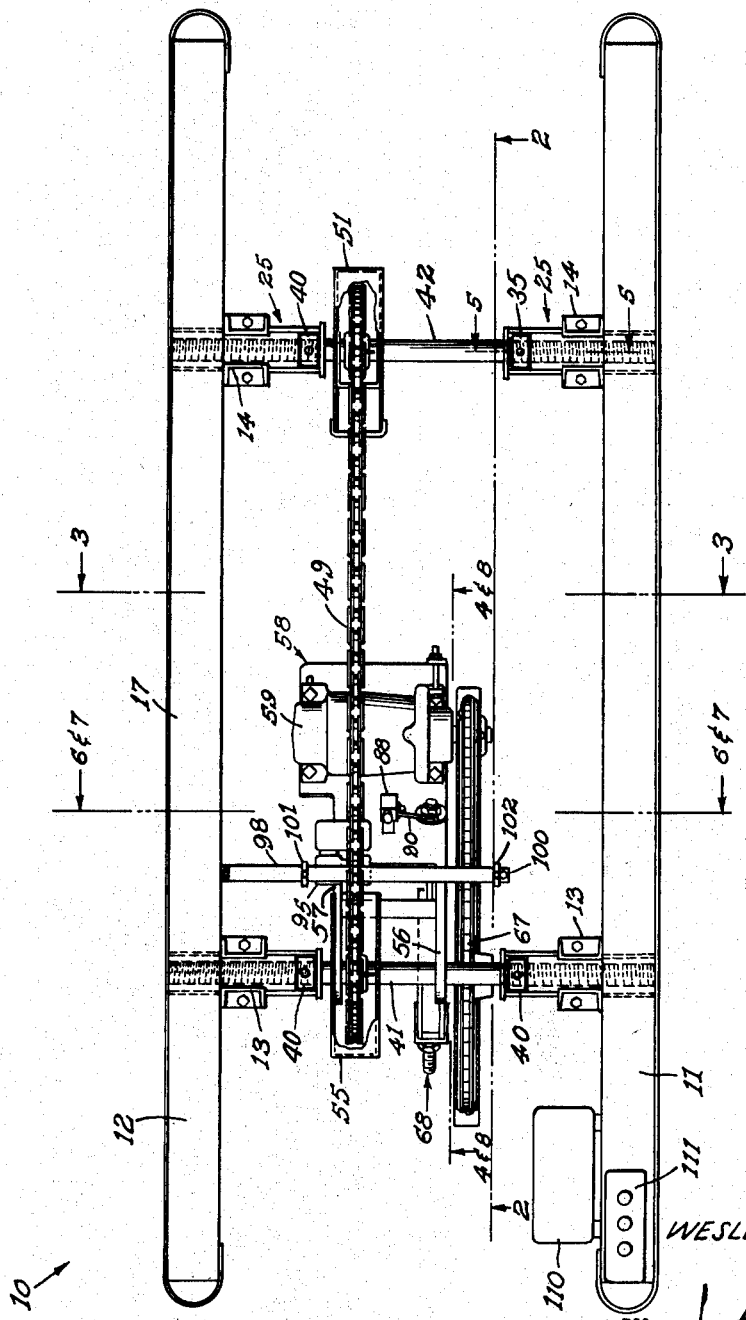
Fig. 1 is a plan view of a preferred embodiment of the invention with the same shown in retracted condition.

Referring specifically to the drawings, the invention is there shown as embodied in a car squeeze 10 which comprises a pair of parallel load engaging frames 11 and 12 which are identical so that a description of one will suffice for both.

Frame 11 includes double chanel posts 13 and 14, each of which has secured upon its lower end a free swivel caster 15 mounting a wheel 16, the posts 13 and 14 being connected horizontally by upper and lower channel iron pressure beams 17 and 18.

The joints between the posts 13 and 14, and beams 17 and 18, are reinforced by gussets 19. Welded in place between upper portions of the channels of each post 13 and 14, is a nut mounting 25 which comprises a cylindrical sleeve 26 and a U-shaped member 27. The sleeve 26 has a smooth bore 28 and the member 27 has side walls 29 and a face plate 30 which is preferably removably secured to the side walls for convenience of assembly.

The face plate 30 has a hole 31 which is concentric with the bore 28 and which, in turn, receives a bushing 32 having a hole 33 which is of the same diameter as, and concentric with, the sleeve bore 28.

Provided in the nut mountings 25 of the frame 11 are nuts 35 having right hand internal threads, these nuts fitting closely between the sleeve 26 and bushing 32 and also snugly fitting the space between the walls 29 of the member 27. Each nut 35 is provided with a grease cup 36 and is held in position in its respective mounting 25 in a manner to be made clear hereinafter.

The same reference numerals used in describing frame 11 may also be applied to corresponding parts in frame 12 excepting that frame 12 has nuts 40 which are provided internally with left-hand threads but are otherwise like nuts 35.

The frames 11 and 12 are held in parallel spaced relation by screw shafts 41, 42, 43 and 44. The opposite ends of these shafts are provided with right-hand threads and left-hand threads which are screwed respectively through nuts 35 and 40 (as shown in Figs. 1, 3 and 5). Fixed on these screw shafts are sprockets 45, 46, 47 and 48, an endless chain 49 being trained about these sprockets.

Secured to suitable collars 50, provided on the shafts 42 and 44, is a chain housing 51 on which is mounted a chain tightening mechanism 52 having an idle sprocket 53 over which the chain 49 runs and by which this chain is maintained in taut condition.

A similar housing 55 is mounted on the shafts 41 and 43 to house the sprockets 45 and 48 and the chain 49 where it runs about these.

Pivotally mounted at their upper ends on the shaft 41 are side arms 56 and 57 of a swinging motor mount 58 which carries a geared electric motor 59 having a pinion sprocket 60. The mount 58 has a floor plate 61 on which the motor 59 is mounted, this plate turning upward parallel with the arms 56 and 57 to form a cutout switch mounting plate 62. Collars 63 fixed on shaft 41 prevent motor mount 58 shifting lengthwise on this shaft.

Fixed on the shaft 43 is a master driven sprocket 66 which is connected to the pinion sprocket 60 by an endless chain 67.

Connecting the shaft 43 and the plate 62 is a pressure limit mechanism 68 which is best shown in Figs. 2, 4, 8 and 9. This includes a rectangular block of metal 69 which is apertured to receive a bushing 70 in which the shaft 43 journals. Welded into the upper and lower faces of the block 69 are stud bolts 71 and 72. A U-shaped member 73, having slots 74 for accommodating the shaft 43 and having a hole 75 for the stud bolt 71 to pass through, is assembled on the shaft 43 and stud bolt 71 (as shown in Fig. 8).

A channel cap 76 is slipped over the stud bolt 72 to enclose the open end of the U-shaped member 73 and nuts 77 and 78 are screwed onto the stud bolt 72 to hold the channel cap 76 against the member 73 and determine the position of the latter with respect to the shaft 43.

The stud bolt 71 extends upwardly substantially perpendicular to the plate 62 and through a suitable hole formed therein to receive a nut 80 having a flange 81. Trapped about the stud bolt 71 between the member 73 and plate 62 are slideable elements 82 and 83 of a gauge 84 and a very heavy coiled compression spring 85.

Secured to the plate 62 adjacent the flange 81 by a pair of bolts 86, having springs 87 between their heads and the plate 62, is a switch 88. Extending from this switch are lugs 89 between ends of which is pivoted a switch arm 90 carrying a roller 91 which normally rests upon the flange 81.

Fixed upon the arm 57 (see Fig. 6) is an arm 94 which carries a switch means 95 having operating arms 96 and 97. Secured to the beam 17 of frame 12 is a switch actuating arm 98 having fixed safety stops 99 and 100 and adjustable switch actuating dogs 101 and 102.

Provided on the frame 11 is a magnetic reversing starter switch 110, and a push button box 111 for manual operation of the car squeeze 10, that is: for starting, stopping or reversing the motor 59. Automatic control of the motor 59 by the switch 88 and switch means 95 is also provided for. These switch means are therefore connected up with the relays in the magnetic reversing starter switch 110 in a manner well known in the art so that a lifting of the switch arm 90 by the flange 81 rising above and away from the plate 62 (as shown in Fig. 4) actuates the switch 88 to stop the motor 59.

The switch means 95 functions to stop the motor 59 whenever the operating arm 96 is engaged by the dog 101 as in Fig. 7. Switch means 95 also functions to reverse the motor 59 when the operating arm 97 is engaged by the dog 102 as shown in Fig. 6.

Referring specifically to Figure 13, it will be seen that the motor 59 operating the driving mechanism for moving frames 11 and 12 is controlled by the magnetic reversing starter switch 110. Manual control of the mechanism is obtained through utilization of the push-button box 111, associated with the starter switch 110. When the motor 59 is placed in operation, it is thereafter automatically controlled by the limit and overload mechanisms, hereinafter described, independently of manual control through the push-button box 111.

The motor 59 is a reversible, three-phase mechanism of suitable capacity, adapted for alternate connection to a three-phase source of power 112 through contactors 113 or 114. The terminals of contactor 113 are so connected as to provide a phase order to the motor 59 which is reversed from that provided by the terminals of the contactor 114, thus enabling reverse operation.

With the contactors 113 and 114 both disposed in their normally open positions, the cycle of operation of the car squeeze mechanism is started by depression of the "Open" button 117 to bridge contacts 118. A one phase circuit is thereby closed through overload switch 89, limit switch 122, "Stop" button 126 and "Close" button 125 to energize the operating coil 119, thereby closing contactor 114 and the associated electrical interlock 120. The interlock 120 establishes a holding circuit to maintain the power connection through the contactor 114 to the motor 59 upon subsequent release of the "Open" button 117.

As the motor 59 expands the frame 11 and 12, dogs 101, and 102 attached to the frame 11 move to the right. (See Figs. 6 and 7.) Dog 101 moves away from the operating arm 96 of the switch means 95 to allow limit switch 121 to close, while dog 102 moves toward the operating arm 97 of the double-pole limit switch 122. As the dog 102 strikes the operating arm 97, limit switch 122 is opened to interrupt the flow of current through the operating coil 119, de-energizing it, thereby permitting contactor 114 to open to consequently stop the motor 59. Continued movement of dog 102 further depresses the arm 97 to close the contact through the secondary terminal of limit switch 122. A circuit is thus established through the switch 122, limit switch 121, "Stop" button 126, "Close" button 125 and the operating coil 123 to close contactor 113 and the associated interlock 124, to thereby operate motor 59 in reverse. The interlock 124 by-passes the circuit through switch 122; accordingly, contactor 113 is held closed even as the dog 102 moves with the frame 11 away from the operating arm 97.

When the frames are fully retracted, dog 101 strikes operating arm 96 to open limit switch 121 to thereby de-energize the coil 123 and stop the motor 59. A normal cycle is now complete.

If, however, an excess pressure condition develops during expansion of the frames 11 and 12, the pressure limit mechanism 68 will open the pressure switch 88 to thus de-energize coil 119 and prevent further separation of the frames 11 and 12. If the operator desires to continue expansion he must adjust the mechanism 68 or he may insert a jumper 88a as shown in dotted lines, in Fig. 13, to by-pass the switch 88. Otherwise the operator may press the "Close" button 125 to retract the frames in a manner explained above.

It is desirous to point out that the mechanism can be halted at any point by depression of the "Stop" button, which in its normal position constitutes a part of the circuit for any operation of the motor. Further, the "Close" button 125 as normally disposed, constitutes a part of the circuit for the expansion operation, whereas the "Open" button is similarly part of the retracting circuit. Accordingly, complete control of the mechanism is at the operator's finger tips.

*Operation*

The car squeeze 10 is equipped with a reflexible electric cord for supplying electricity to the motor 59. This cord is plugged in at a suitable outlet such as is generally available on any shipping platform adjacent to which railroad cars are spotted.

The car squeeze 10 is normally in full retracted condition as shown in full lines in Figs. 1 and 3. It is capable of being extended to a maximum expanded condition as shown in dotted lines in Fig. 3.

The common practice of loading packed and lidded crates of fresh citrus fruits in refrigerated railroad cars requires the use of a car squeeze and Figs. 10, 11 and 12 illustrate the manner in which car squeeze 10 is employed in this practice. These views diagrammatically illustrate a car C having central doors D, Fig. 10 showing partial loads L1 and L2 as these have been placed manually in opposite ends of the car C, leaving a narrow central space S1 therebetween. This view also shows the car squeeze 10 as it is rolled into space S1, the car squeeze being built so that in its retracted condition it is readily received by this space with a slight clearance.

Having thus been inserted in space S1, the electric car squeeze 10 is set in operation by pressing the "Start" button in the button box 111. Having done this, the operator may leave the car squeeze 10 to complete its function of compressing partial loads L1 and L2 and returning itself to normal retracted condition.

Fig. 11 illustrates the car squeeze 10 fully expanded to produce an enlarged central space S2. This expansion follows starting the motor 59 by manually actuating the "Start" button as above noted.

As the car squeeze expands, the switch actuating arm 98 travels outwardly with the pressure beam 17, to which it is attached, with the result that the dog 102 engages operating arm 97 of the limit switch 122 of the switch means 95 as shown in Fig. 6 which reverses the motor 59 and starts the latter retracting the frames 11 and 12 towards each other. This continues until the inward movement of the beam 17 brings the dog 101 against the operating arm 96 of limit switch 121 of the switch means 95 which shuts off the motor 59, leaving the car squeeze 10 in a fully retracted condition as shown in Fig. 12.

A considerable saving of time as well as labor is effected by the electric car squeeze 10 in that this merely needs to be rolled into the car and started, after which, the attendant may employ his time elsewhere until the compressing operation has been completed and the car squeeze is ready to be withdrawn from the car as shown in Fig. 12.

As several cars are generally being loaded simultaneously, there are many other duties requiring the attention of the attendant and to which he may profitably devote the time saved by the automatic operation of the electric car squeeze 10.

It sometimes happens that through over-sized boxes or off-sized cars, the anticipated susceptibility of partial loads L1 and L2 to compression does not develop. In such a case, the loads L1 and L2 would be damaged by attempting to apply more than a given pressure thereto.

The electric car squeeze 10 is adapted to complete the compression of partial loads L1 and L2 and then automatically return to its normal retracted condition as shown in Figs. 10, 11 and 12, excepting where excessive pressure is developed in this compression, in which event the car squeeze 10 will automatically shut off and remain in the position where this maximum pressure was attained.

Furthermore, the squeeze 10 is capable of adjustment so that the maximum pressure at which it will thus shut off may be selected. In the embodiment illustrated, in which a ½ H. P. motor is employed, this maximum pressure may be selected by manipulation of the nut 80 on the stud bolt 71 to be anywhere from four-tons up to ten-tons.

Figure 2:
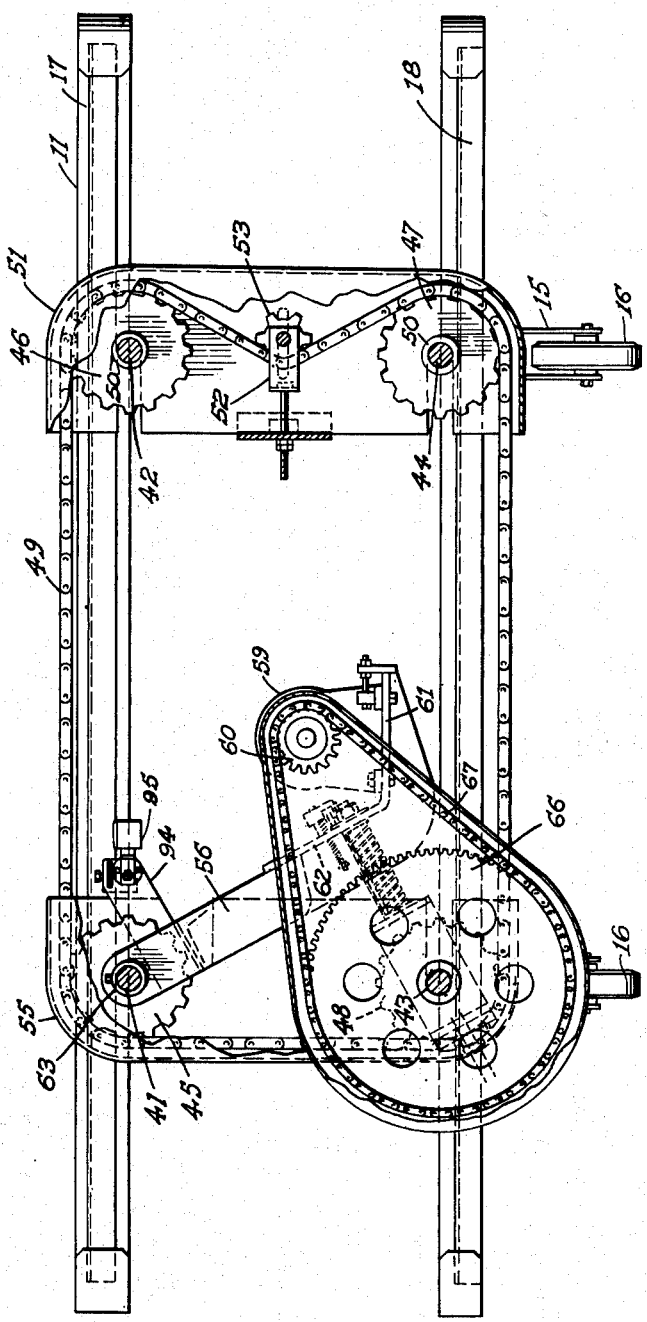
Fig. 2 is a vertical longitudinal sectional view taken on the line 2—2 of Fig. 1.

This pressure regulated motor cut off operates through the tension of the chain 67 in transmitting rotation to the master drive sprocket 66 which is fixed on the screw shaft 43 (see Figs. 2 and 4).

The tautness of the chain 67 is maintained by adjustment of the nuts 77 and 78 and it is necessary to correspondingly adjust the latter when there is any change in the adjustment of the nut 81 so as not to change the tautness of the chain 67.

Fig. 4 shows what takes place during the operation of the electric car squeeze 10 when a predetermined maximum pressure, for which it has been set, is reached. This happens when the tension applied to the chain 67 by the motor 59, in order to rotate the master drive sprocket 66, exceeds the compressive tension of the spring 85 so as to further compress this. This causes the flange 81 of the nut 80 to lift the switch lever 90 and actuate switch 88 to shut off the motor.

An advantage of the motor being cut off at this point, rather than reversed to return the car-squeeze to fully retracted condition, is that the attendant's attention is thus called to the fact that the squeeze has not proceeded to fully expanded condition. He may then judge whether further pressure should be applied or an adjustment made in the provisions for filling the central space in the car C to complete the loading of this car. If, at this point, the attendant desires the car squeeze to return to fully retracted condition, he merely presses the "Close" button in the box 111 whereupon the motor 59 starts in reverse direction and continues running until it is automatically shut off by dog 101 engaging the operating arm 96 of the means 95 as shown in Fig. 7.

The gauge 84 functions by means of indicia provided on slideable element 83 to indicate the number of pounds pressure which, when exerted by the car squeeze 10, will further compress the spring 85, actuate the switch 88, and shut off the motor 59. This gauge is calibrated so that for any given adjustment of the nut 80, the lowermost indicia exposed to view on the element 83 indicates the pressure at which the motor will be stopped.

By adjusting dogs 101 and 102 on switch actuating bar 98, the width of the squeeze 10 when in its collapsed and expanded conditions, may be varied at will.

The claims are:

1. In a car squeeze the combination of: a pair of upright parallel load engaging frames; power means connecting said frames for expanding or contracting said squeeze by moving said frames away from or toward each other; wheeled carriage means on said frames to movably support said squeeze; means for starting the operation of said power means to expand said squeeze; and means responsive to the attainment of a given degree of pressure between said squeeze and a load being pressed thereby, to interrupt the operation of said power means and thereby halt the expansion of said car squeeze.

2. In a car squeeze the combination of: a pair of upright parallel load engaging frames; power means connecting said frames for expanding or contracting said squeeze by moving said frames away from or toward each other; wheeled carriage means on said frames to movably support said squeeze; means for starting the operation of said power means to expand said squeeze; means, responsive to the attainment of a given width of expansion by said squeeze, to reverse said power means automatically; and means to automatically halt operation of said power means when said frames are retracted to their initial spacing.

3. In a car squeeze the combination of: a pair of upright parallel load engaging frames; power means connecting said frames for expanding or contracting said squeeze by moving said frames away from or toward each other; wheeled carriage means on said frames to movably support said squeeze; means for starting the operation of said power means to expand said squeeze; means responsive to the attainment of a given degree of pressure between said squeeze and a load being pressed thereby, to interrupt the operation of said power means and thereby halt the expansion of said car squeeze; and means provided for predetermining the degree of pressure at the attainment of which the operation of said power means is interrupted.

4. A combination as in claim 2 in which means is provided for predetermining the width of expansion, the attainment of which causes reversal of said power means.

5. In a car squeeze the combination of: a pair of upright parallel load engaging frames; multiple screw means connecting said frames in expansible parallel relation; power means connected to said screw means for expanding or contracting said squeeze by moving said frames away from or toward each other while maintaining said frames in parallelism; wheeled carriage means on said frames to movably support said squeeze; means for starting the operation of said power means to expand said squeeze; and means responsive to the attainment of a given degree of pressure between said squeeze and a load being pressed thereby, to interrupt the operation of said power means and thereby halt the expansion of said car squeeze.

6. In a car squeeze the combination of: a pair of upright parallel load engaging frames; multiple screw means connecting said frames for expanding or contracting said squeeze by moving said frames away from or toward each other while maintaining said frames in parallelism; a power means mounted on said squeeze and connected to said multiple screw means for the actuation thereof; wheeled carriage means on said frames to movably support said squeeze; means for starting the operation of said power means to expand said squeeze; means, responsive to the attainment of a given width of expansion by said squeeze, to reverse said power means automatically, and thereby cause the latter to actuate said multiple screw means to retract said frames to their initial spacing; and means to automatically halt operation of said power means when said frames have been so retracted.

7. In a car squeeze the combination of: a pair of upright parallel load engaging frames; four nuts on each of said frames; four double-ended screws, having right and left hand threads on their opposite ends and uniformly screwed through said nuts, one nut on each end of each shaft, to hold said frames spaced in parallel relation; a drive transmission connecting said screws to rotate these in said nuts for expanding or retracting said squeeze by moving said frames away from or toward each other; wheeled carriage means on said frames to movably support said squeeze; power means mounted on said squeeze and connected to said screw drive means to actuate the latter to expand or contract said squeeze as aforesaid; means for starting the operation of said power means to expand said squeeze; and means responsive to the attainment of a given degree of pressure between said squeeze and a load being pressed thereby, to interrupt the operation of said power means and thereby halt the expansion of said car squeeze.

8. In a car squeeze the combination of: a pair of upright load engaging frames; four nuts on each of said frames; four double-ended screws, having right and left hand threads on their opposite ends and uniformly screwed through said nuts, one nut on each end of each shaft, to hold said frames spaced in parallel relation; a drive transmission connecting said screws to rotate these in said nuts for expanding or retracting said squeeze by moving said frames away from or toward each other; wheeled carriage means on said frames to movably support said squeeze; power means mounted on said squeeze and connected to said screw drive means to actuate the latter to expand or contract said squeeze as aforesaid; means for starting the operation of said power means to expand said squeeze; and means responsive to the attainment of a given width of expansion by said squeeze, to reverse said power means automatically to return said frames to their initial spacing.

9. In a car squeeze the combination of: a pair of upright load engaging frames; four nuts on each of said frames; four double-ended screws, having right and left hand threads on their opposite ends and uniformly screwed through said nuts, one nut on each end of each shaft, to hold said frames spaced in parallel relation; a drive transmission connecting said screws to rotate these in said nuts for expanding or retracting said squeeze by moving said frames away from or toward each other; wheeled carriage means on said frames to movably support said squeeze; power means mounted on said squeeze and connected to said drive means to actuate the latter to expand or contact said squeeze as aforesaid; means for starting the operation of said power means to expand said squeeze; and means, responsive to the attainment of a given degree of pressure between said squeeze and a load being pressed thereby, to interrupt the operation of said power means and thereby halt the expansion of said car squeeze.

10. In a car squeeze the combination of: a pair of upright load engaging frames carrying nuts; a plurality of screw shafts threaded oppositely at their opposite ends and screwing into said nuts, one nut on each end of each shaft, to hold said frames in spaced parallel relation; transmission means for rotating said shafts in unison to expand or contract said squeeze by moving said frames away from or toward each other while maintaining the latter in parallelism; a power means supported on certain of said shafts and connected to said shafts through said transmission means for the rotation of said shafts; wheeled carriage means on said frames to movably support said squeeze; and control means for said power means operative, when the latter has been set in operation to expand said squeeze from its normal retracted condition to its fully expanded condition, to reverse said power means to reverse rotation of said screw shafts to contract said squeeze to its normal condition and, upon attaining this, to shut off said power means.

11. In a car squeeze the combination of: a pair of upright load engaging frames equipped with oppositely threaded nuts; a plurality of shafts oppositely threaded at their opposite ends and screwed into said nuts, one nut on each end of each shaft, to hold said frames spaced in parallel relation; means connecting said shafts for uniform concurrent rotation; a motor; a motor mount for supporting said motor and pivotally supported on one of said screw shafts; means preventing said mount from shifting axially on said shaft; transmission means for connecting said motor to a second one of said shafts; and means responsive to the resistance offered by said last mentioned shaft to its being turned by said motor to stop the expansion of said squeeze by shutting off said motor.

12. In a car squeeze the combination of: a pair of upright load engaging frames, each having a plurality of oppositely threaded nuts; a plurality of screw shafts oppositely threaded at their opposite ends and screwed into said nuts, one nut on each end of each shaft, to hold said frames spaced in parallel relation; means connecting said shafts for uniform concurrent rotation; a motor mount pivotally mounted on one of said shafts; means preventing said mount from shifting axially on said shaft; a motor provided on said mount; means provided on a second of said shafts and yieldably preventing rotation of said mount toward said second shaft; sprockets on said motor and said second shaft; a drive chain trained about said sprockets; and means responsive to the compression of said yieldable means by the transmission of power from said motor to said second shaft through said sprockets and said chain to halt the operation of said motor producing said power.

13. A combination as in claim 12 in which means is provided for placing said yieldable means under a predetermined pressure thereby selecting the amount of power which must be transmitted to said second shaft in order to halt the operation of said motor.

14. A combination as in claim 13 in which said means on said second shaft also provides means for adjusting the tautness of said chain.

15. A car squeeze comprising relatively movable load-engaging frames, driving mechanism operably connected to said frames to provide relative movement of said frames away from one another, and means responsive to the attainment of a given degree of pressure between said frames and a load engaged thereby to interrupt the operation of said driving mechanism to prevent further movement of said frames.

16. A car squeeze comprising relatively movable frames, drive members for effecting relative movement of said frames away from one another, control means to stop the relative movement of said frames, means supporting said drive members for relative bodily movement in a manner to operate said control means, means for yieldably maintaining said drive members in predetermined relative positions, and means responsive to the application of a predetermined pressure on said frames to displace said drive members from their predetermined and yieldably maintained relative positions to operate said control means and thereby arrest movement of said frame.

17. A car squeeze comprising relatively movable frames, drive mechanism including driving and driven sprockets and a chain interconnecting said sprockets for effecting relative movement of said frames away from one another, means supporting one of said sprockets for bodily movement relative to the other of said sprockets, control means to stop said drive mechanism and interrupt the relative movement of said frames, and means effective upon the movement of said movable sprocket in response to a predetermined amount of pull on said chain to operate said control means.

18. A car squeeze comprising relatively movable frames, drive mechanism including driving and driven sprockets and a chain interconnecting said sprockets for effecting relative movement of said frames away from one another, means supporting one of said sprockets for bodily movement relative to the other of said sprockets, means urging said movable sprocket away from the other of said sprockets for tensioning said chain thereon, control means to stop said drive mechanism and interrupt the relative movement of said frames, and means effective upon the movement of said movable sprocket in response to a predetermined amount of pull on said chain to operate said control means.

19. A car squeeze comprising movable frames, driving mechanism for moving said frames away from one another, means for reversing said driving mechanism to retract said frames, and means operably connected to one of said frames to actuate said reversing means and cause retraction of said frames upon the attainment of a predetermined maximum separation.

20. A car squeeze comprising movable frames, driving mechanism for moving said frames away from one another, means for reversing said driving mechanism to retract said frames, means operably connected to one of said frames to actuate said reversing means and cause retraction of said frames upon the attainment of a predetermined maximum separation, and means for automatically stopping said driving mechanism to arrest the retraction of said frames upon the attainment of a predetermined minimum of frame separation.

WESLEY M. ROBEY, Jr.

REFERENCES CITED

The following references are of record in the file of this patent:

UNITED STATES PATENTS

| Number | Name | Date |
| --- | --- | --- |
| 1,805,531 | Stoltz | May 19, 1931 |
| 2,086,283 | Pierce | July 6, 1937 |
| 2,252,283 | Brase | Aug. 12, 1941 |
| 2,424,768 | Nalbandian | July 29, 1947 |